Patented Apr. 27, 1943

2,317,958

UNITED STATES PATENT OFFICE 2,317,958

EMULSIFYING CHEESE

James D. Ingle, Chicago, Ill., assignor to Industrial Patents Corporation, Chicago, Ill., a corporation of Delaware No Drawing. Application October 30, 1939, Serial No. 301,945

7 Claims. (Cl. 99—117)

This invention relates to improvements in the manufacture of processed cheese.

One of the objects of this invention is to provide a method of making a soft cheese emulsion.

Another object of this invention is to provide a pasteurized processed cheese having an exceedingly smooth body and texture.

Other objects and advantages of this invention will become apparent from the description and claims which follow.

The present invention contemplates the use of calcium lactate as an emulsifying agent or fluxing agent in the manufacture of processed cheese. The presence of various other materials in cheese products does not affect adversely the action of the emulsifying agents.

In the manufacture of processed cheese, a normally solid cheese, for example, Cheddar, is comminuted in any suitable manner. The comminuted cheese is then placed in a suitable heating vessel which is generally provided with a steam jacket, and the comminuted cheese is heated to a pasteurizing temperature for a short period of time. The cheese is continuously agitated during the heating and pasteurizing operation.

Upon cooling of the pasteurized cheese mass, however, the mass does not set to a smooth bodied, firm, and solid mass, which is necessary to provide a cheese which may be easily sliced. The cheese product is grainy and sandy and presents an unattractive appearance.

Various emulsifying agents or fluxing agents have been added to cheese during the pasteurization or heating process to overcome the development of a grainy or sandy texture in the finished product. Among the emulsifying agents which have been proposed are certain alkaline salts of hydroxy acids such as sodium lactate, sodium and ammonium tartrates, ammonium and sodium citrates, and sodium phosphate.

I have discovered that the use of calcium lactate as an emulsifying or fluxing agent in the manufacture of pasteurized processed cheese results in the production of a product having unusual properties. The action of calcium lactate when used as an emulsifier in the pasteurization or manufacture of processed cheese is quite different from the action of alkali salts of lactic acid, such as sodium and potassium lactate.

The use of calcium lactate has been found to result in the preparation of a soft cheese emulsion not obtainable by the use of other alkaline salts of lactic acid, and the like. Pasteurized processed cheese which is prepared by using calcium lactate possesses a smoother body and texture than cheese prepared by the use of sodium and potassium lactates. Cheese prepared by using calcium lactate possesses a natural flavor which is not bound up in the cheese as it is in cheese made with many of the common emulsifying or fluxing agents.

The flavor of processed cheese is dependent upon the proportion of aged cheese employed in the preparation of the processed cheese and on the type of cheese emulsion. The type of emulsion which is produced is, in turn, dependent upon the emulsifying agent employed. Certain emulsifying agents produce a product which is more or less gummy when chewed, and the natural or true cheese flavor is not readily apparent, and the flavor is said to be bound up in the cheese. In aged cheese which has not been processed and in processed cheese having a soft emulsion prepared in accordance with the present invention, the natural or true cheese flavor becomes readily apparent as soon as the cheese is masticated, and it is said that the flavor is not bound up in the cheese.

Although the calcium lactate may be employed as an emulsifying agent or fluxing agent in a wide variety of cheese, my invention will be illustrated specifically as applied to Cheddar cheese.

A quantity of Cheddar cheese is comminuted and placed in a steam jacketed vessel. Steam is then allowed to flow through the jacket to heat the comminuted cheese. A small quantity of calcium lactate is then dissolved and dispersed in water and the solution and dispersion added to the comminuted cheese.

The proportion of calcium lactate which is added to the cheese may vary from about 1 per cent to 5 per cent, the exact amount not being critical. I prefer to add about 10 per cent water to the cheese. The desired quantity of calcium lactate is dissolved and dispersed in the 10 per cent water and the solution then added directly to the cheese in the vessel. It is not essential, however, that the calcium lactate be dissolved and dispersed in water before adding it to the cheese. The water aids in obtaining a better distribution of the calcium lactate in the cheese mass.

During the entire heating process the cheese and the added materials are thoroughly agitated. The mass is heated to a suitable pasteurizing temperature, for example, to a temperature of from about 130 degrees to about 180 degrees Fahrenheit. The mass is then maintained at the pasteurizing temperature for a suitable period of time until the pasteurization is completed, which may be from one half hour to one hour. The pasteurization temperature and time are variable, as is well known. The cheese mass may then be discharged from the vessel into desired molds and allowed to cool.

The pasteurized processed cheese so prepared possesses a smooth body and texture. The cheese product possesses a natural flavor which is not bound up in the cheese as it generally is in cheese made with prior art emulsifying agents.

I claim:

1. The method of processing cheese which comprises adding to cheese calcium lactate in sufficient quantity to act as an emulsifying agent and improve the body and texture of the finished cheese, agitating the mixture of cheese and calcium lactate, and heating the mass to a pasteurizing temperature.

2. The method of processing cheese which comprises adding to cheese from 1 per cent to 5 per cent calcium lactate, agitating the mass, and heating the mass to a temperature of from 130 degrees to 180 degrees F. to produce a soft cheese emulsion having a smooth body and texture.

3. The method of processing cheese which comprises adding to cheese from 1 per cent to 5 per cent calcium lactate and about 10 per cent water, agitating the mass, heating the mass to a pasteurizing temperature, maintaining the mass at the pasteurizing temperature until pasteurization is completed to produce a soft cheese emulsion having a smooth body and texture, transferring the mass into molds, and permitting the cheese to cool in the molds.

4. As an article of manufacture, a pasteurized processed cheese consisting of a soft cheese emulsion having a smooth body and texture and containing calcium lactate in sufficient quantity to act as an emulsifying agent.

5. As an article of manufacture, a pasteurized processed cheese consisting of a soft cheese emulsion having a smooth body and texture and containing from 1 per cent to 5 per cent calcium lactate.

6. The method of producing processed cheese which comprises adding to aged cheese calcium lactate in sufficient amount to act as an emulsifying agent and improve the body and texture of the finished cheese, agitating and heating the mixture to a pasteurizing temperature.

7. The method of producing processed cheese which comprises adding to aged cheese one to five per cent calcium lactate, agitating the mixture and heating it to a pasteurizing temperature to produce a cheese having an improved body and texture.

JAMES D. INGLE.